(12) United States Patent
Alley et al.

(10) Patent No.: US 9,128,726 B2
(45) Date of Patent: Sep. 8, 2015

(54) SYSTEMS AND METHODS FOR INTERFACING MASTER AND SLAVE PROCESSORS

(75) Inventors: Daniel Milton Alley, Earlysville, VA (US); Xiaomin Hu, Shanghai (CN); Ye Xu, Shanghai (CN)

(73) Assignee: General Electric Company, Schenectady, NY (US)

( * ) Notice: Subject to any disclaimer, the term of this patent is extended or adjusted under 35 U.S.C. 154(b) by 397 days.

(21) Appl. No.: 13/640,728

(22) PCT Filed: Dec. 14, 2011

(86) PCT No.: PCT/CN2011/083975
§ 371 (c)(1),
(2), (4) Date: Oct. 11, 2012

(87) PCT Pub. No.: WO2013/086704
PCT Pub. Date: Jun. 20, 2013

(65) Prior Publication Data
US 2014/0208070 A1    Jul. 24, 2014

(51) Int. Cl.
*G06F 13/00* (2006.01)
*G06F 9/38* (2006.01)
*G06F 15/17* (2006.01)

(52) U.S. Cl.
CPC .............. *G06F 9/3877* (2013.01); *G06F 15/17* (2013.01)

(58) Field of Classification Search
None
See application file for complete search history.

(56) References Cited

U.S. PATENT DOCUMENTS

| 5,970,069 | A | * | 10/1999 | Kumar et al. ................ 370/402 |
| 6,993,617 | B2 | * | 1/2006 | Butcher et al. ............... 710/305 |
| 7,093,153 | B1 | * | 8/2006 | Witek et al. .................. 713/600 |
| 2004/0151203 | A1 | * | 8/2004 | Gulati et al. ................. 370/465 |
| 2004/0176857 | A1 | | 9/2004 | Tsunedomi et al. |
| 2008/0147901 | A1 | * | 6/2008 | Gloekler et al. ............... 710/11 |
| 2008/0276132 | A1 | * | 11/2008 | Majewski et al. ............. 714/55 |
| 2009/0013056 | A1 | * | 1/2009 | Weinstock et al. ........... 709/208 |

(Continued)

FOREIGN PATENT DOCUMENTS

CN    101095123 A    12/2007
CN    101533384 A    9/2009

OTHER PUBLICATIONS

International Search Report and Written Opinion issued in connection with corresponding PCT Application No. PCT/CN2011/083975 dated Sep. 20, 2012.

*Primary Examiner* — Henry Tsai
*Assistant Examiner* — Christopher Bartels
(74) *Attorney, Agent, or Firm* — Global Patent Operation; Peter T. DiMauro

(57) ABSTRACT

System and methods are provided. In one embodiment, a system includes a first processor comprising a serial peripheral interface (SPI) port, and a second processor. The system further includes a galvanic isolation barrier. The system additionally includes a SPI bridge comprising a first output pin control configured to control a device. The SPI bridge additionally includes a first analog multiplexor control configured to route signals to a circuitry. The SPI bridge is configured to communicatively couple the first processor with the second processor through the galvanic isolation barrier, and to communicatively couple the first processor to the device through the first output pin control, and to route the signals between the first processor and the circuitry by using the first analog multiplexor control.

9 Claims, 3 Drawing Sheets

(56) References Cited

U.S. PATENT DOCUMENTS

| | | | |
|---|---|---|---|
| 2009/0019328 A1* | 1/2009 | Van De Logt | 714/727 |
| 2009/0030558 A1* | 1/2009 | Rogers et al. | 700/297 |
| 2010/0325326 A1* | 12/2010 | Huang et al. | 710/110 |
| 2011/0064246 A1* | 3/2011 | Loeppert et al. | 381/107 |
| 2011/0072297 A1* | 3/2011 | Huang | 713/500 |
| 2011/0225339 A1* | 9/2011 | Chen | 710/313 |
| 2012/0072628 A1* | 3/2012 | Crockett et al. | 710/110 |
| 2012/0137163 A1* | 5/2012 | Sasagawa | 714/3 |

* cited by examiner

SYSTEMS AND METHODS FOR INTERFACING MASTER AND SLAVE PROCESSORS

CROSS-REFERENCE TO RELATED APPLICATION

This application claims priority to and benefit of PCT Application No. PCT/CN2011/083975 entitled "SYSTEMS AND METHODS FOR INTERFACING MASTER AND SLAVE PROCESSORS", filed on Dec. 14, 2011, which is herein incorporated by reference in its entirety.

BACKGROUND OF THE INVENTION

The subject matter disclosed herein relates to the interfacing of systems, and more specifically, to the interfacing of master and slave processors.

Certain systems, such as data acquisition systems, may provide for the use of multiple processors. For example, a slave processor may be communicatively coupled to a master processor. The master processor may delegate certain processing tasks, such as data acquisition tasks, to one or more of the slave processors. Acquired data may then be provided to the master processor. It would be beneficial to improve the interface between the master and slave processors.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a first processor comprising a serial peripheral interface (SPI) port, and a second processor. The system further includes a galvanic isolation barrier. The system additionally includes a SPI bridge comprising a first output pin control configured to control a device. The SPI bridge additionally includes a first analog multiplexor control configured to route signals to a circuitry. The SPI bridge is configured to communicatively couple the first processor with the second processor through the galvanic isolation barrier, and to communicatively couple the first processor to the device through the first output pin control, and to route the signals between the first processor and the circuitry by using the first analog multiplexor control.

In a second embodiment, a method includes transmitting data from a first processor through an isolation barrier, and determining if the data includes a custom pattern. If the data does not include the custom pattern, the method includes using a serial peripheral interface (SPI) communications protocol. If the data includes the custom pattern, the method includes using a custom communications protocol. The method also includes transmitting the data to a second processor and building a reply by using a reply register. The method additionally includes communicating the reply to the first processor through the isolation barrier.

In a third embodiment, a system includes a serial peripheral interface (SPI) bridge configured to communicatively couple a first processor having a SPI port to a second processor. The SPI bridge includes a data multiplexor configured to route signals for the first processor and a first register configured to communicatively couple the data multiplexor to the first processor. The SPI bridge further includes an output pin control communicatively coupled to the data multiplexor and configured to control a device and serial digital interface (SDI) combinatorial logic system. The SPI bridge further includes a second register communicatively coupled to a second processor through the SDI combinatorial logic system, and a reply register communicatively coupled to the data multiplexor, wherein the first processor is configured to use the data multiplexor to reply to a command issued by the second processor through an isolation barrier.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
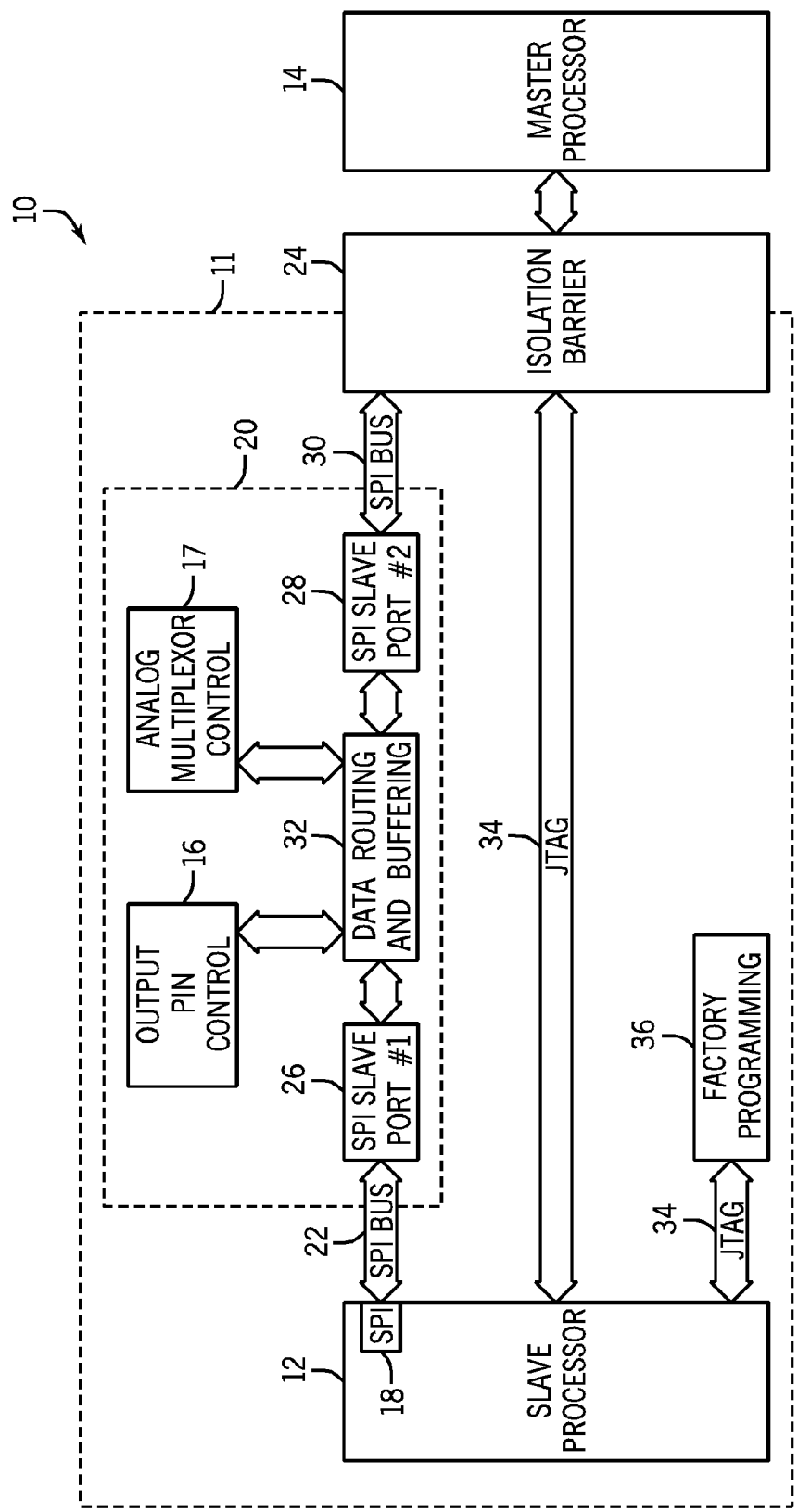
FIG. 1 is a block diagram of an embodiment of a master processor communicatively coupled to a slave processor.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain processor-based systems, such as data acquisition systems, may include multiple processors. For example, one or more master processors may be communicatively coupled to one or more slave processors. The master processors may delegate data acquisition tasks to the slave processors, and communicate with the slave processors over an isolation barrier. The isolation barrier may provide for electrical isolation between the master and slave processors, thus improving the transmission of signals and enhancing the protection of circuitry. In one embodiment, a serial peripheral interface (SPI) may be used to communicate across the isolation barrier. The SPI may include a "four-wire" serial bus including four pins suitable for communicatively coupling a slave processor with a master processor. Alternatively, the SPI may be used to couple the slave processor to analog multiplexor controls or to output pin controls. Unfortunately, certain slave processors that include a single SPI port cannot use the SPI port to communicatively couple the slave processor to the master process, the analog multiplexor controls, and the output pin controls. That is, the use of the single SPI port precludes the communicative use of the SPI as a communication interface between the slave processor and more than one of the master processor, the multiplexor controls, or the output pin control. The single SPI port can typically be used to communicatively couple the slave processor to only one of the master processor, the analog multiplexor controls, or the output pin controls.

The systems and methods described herein enable the use of the SPI protocol to couple the slave processor having a single SPI port to a variety of systems, including a combination consisting of the master processor, the analog multiplexor controls and the output pin controls. Indeed, by using the systems and methods described herein, the slave processor having the single SPI port may be communicatively coupled to all three of the master processor, the multiplexor controls, and the output pin controls. Additionally, the system and methods described herein may allow the flow of information, such as reprogramming information, between the master and slave processors through the isolation barrier.

With the foregoing in mind and turning now to FIG. 1, the figure depicts a block diagram of an embodiment of an electronic system 10, including a galvanically isolated data acquisition system 11. The data acquisition system 11 includes a slave processor 12 communicatively coupled to a master processor 14, output pin controls 16, and analog multiplexor controls 17 by using a single SPI port 18 connected to a SPI bridge or interface system 20 through a SPI bus 22. For example, the slave processor 12 may be an Analog Devices microcontroller model number ADuC7061, which includes a single 8-bit SPI port 18 suitable for coupling to the SPI bus 22. It is to be noted that, in other embodiments, the slave processor 12 may be other microprocessors, such as microprocessors including a 16-bit SPI port 18, a 32-bit SPI port 18, a 64-bit SPI port 18, or multiple SPI ports 18.

The SPI bridge or interface system 20 may be used to communicatively interface the slave processor's SPI port 18 with the master processor 14 through a galvanic isolation barrier 24. The isolation barrier 24 may be any isolative device suitable for galvanically isolating a section of electrical circuitry, such as a capacitive isolation barrier, an inductive isolation barrier, an optical isolation barrier, or a combination thereof. The SPI bridge 20 may additionally be used to communicatively interface the slave processor 12 to the output pin control 16. For example, the output pin control 16 may be driven by the slave processor and used to control an output device. The output device may be an actuator suitable for operating devices, a valve, a pump, a compressor, and so forth. The SPI bridge 20 may also be used to communicatively interface the slave processor 12 to the analog multiplexor control 17. The analog multiplexor control 17 may be used to multiplex or otherwise route signals from the slave processor 12 to any number of electronic and/or electrical systems. For example, the multiplexor may route signals to subsystems of the electronic system 10 electrically isolated by the isolation barrier 24. It is to be noted that while the depicted SPI bridge 20 is illustrated as including a single output pin control 16 and a single analog multiplexor control 17, other embodiments may include multiple output pin controls 16 and/or multiple analog multiplexor controls 17. Indeed, the SPI bridge 20 may be used to interface the slave processor 12 to a plurality of output pin controls 16 and/or a plurality of analog multiplexor controls 17.

In one embodiment, the SPI bridge 20 includes a complex programmable logic device (CPLD), a field-programmable gate array (FPGA), a programmable array logic (PAL), application specific integrated circuit (ASIC), or a combination thereof, suitable for creating a logic or executable functions used in for performing hardware operations on signals, as described in more detail below. That is, a CPLD, an FPGA, a PAL, an ASIC, or a combination thereof may be used to construct the SPI bridge 20. In other embodiments, the SPI bridge 20 may be constructed using any type of electronic device (e.g., custom-designed transistor circuitry) suitable for performing hardware operations on signals, as described in more detail below.

In the depicted embodiment, the SPI bridge 20 provides a first set of registers 26 that may be used to communicate with the slave processor 12. In the depicted embodiment, the registers 26 are compatible with a SPI protocol standard, such as the Motorola 8-bit SPI protocol. Likewise, the SPI bridge 20 provides for a second set of registers 28 that may be used to communicate with the master processor 14 through a SPI bus 30 and the isolation barrier 24. The registers 28, may also be compatible with the Motorola 8-bit SPI standard. Accordingly, information flowing through the SPI port 18 may then be directed, through the use of the first SPI bus 22 and the first set of registers 26, into a data routing and buffering system 32. The data routing and buffering system 32 may include logic or executable functions suitable for directing or otherwise routing information into and from the output pin control 16 and the analog multiplexor control 17. For example, the slave processor 12 may control an output device (e.g., valve, pump, compressor) by sending or receiving signals placed through the SPI port 18 into the registers 26, which are then directed to the output pin control 16 through the data routing and buffering system 32. Data having more than 8-bits may be buffered through multiple data transfers, and the longer bit data may then be placed onto the output pin control 16 by the data routing and buffering system 32. Similarly, the slave processor 12 may route signals through the analog multiplexor control 17 to other electrical systems by using the SPI port 18. For example, signals directed to the analog multiplexor control 17 may also be placed into the registers 26, which may then be directed into the analog multiplexor control 17 through the data routing and buffering system 32. Such signals may also be buffered through multiple data transfers to produce data having more than 8 bits.

The data routing and buffering system 32 may also be used to interface with the master processor 14. For example, the master processor 14 may place signals through the isolation barrier 24 through the SPI bus 30 and into the second registers 28. The signals may then be provided to first registers 26 by the data routing and buffering system 32 and be directed into the SPI port 18 through the SPI bus 22. Slave processor 12 signals directed to the master processor 14 may follow the opposite path (e.g., from the first registers 26 through the bus 22 and into the data routing and buffering system 32, from the routing and buffering system 32 through the bus 30 and the isolation barrier 24 and into the master processor 14). By providing for the transmission of signals to and from the output pin control 16, the analog multiplexor control 17, and the master processor 14, the SPI bridge 20 may functionally extend the pin count of the SPI port 18, thus enhancing the communicative capabilities of the slave processor 12. For example, the SPI port 18 may have a four pin count, yet the use of the SPI bridge 20 provides for communicative coupling with at least three systems (e.g., master processor 14, output pin control 16, and analog multiplexor control 17) without sacrificing data transfer speed. Additionally, the number of pins (e.g., 4 pins) of isolation barrier 24 may be minimized, thus improving signal quality and reducing noise.

Additionally, the SPI bridge 20 allows the transmission of programming signals through control of the JTAG bus 34 through the isolation barrier 24. Indeed, some of the JTAG signals may be used to debug or to flash (e.g., write to memory) the slave processor 12. For example, a new program including computer instructions or code executable by the slave processor 12 may be transmitted through the isolation barrier 14 by using the JTAG signals in combination with the SPI bus 22. The slave processor 12 may then store the new program in memory and execute the new program, as desired. Likewise, debugging, testing, validation, verification, maintenance, and other software improvement operations for the slave processor 12 may be enabled through the use of the JTAG signals. For example, boundary-scan cells may be used to capture or force data from core logic of the slave processor 12, useful in improving the software residing in the slave processor 12. A factory connection 36 may also be used to provide for JTAG functionality. For example, certain pins of the factory connection 36 may be dedicated to send and/or receive the JTAG signals. By providing for the use of JTAG signals, in addition to the aforementioned reduction in pin count of the isolation barrier 24, the SPI bridge 20 may enable a more maintainable and testable slave processor 12. The functionality of the data acquisition system 11 may be additionally described in a detailed view, such as the detailed view shown in FIG. 2.

Figure 2:
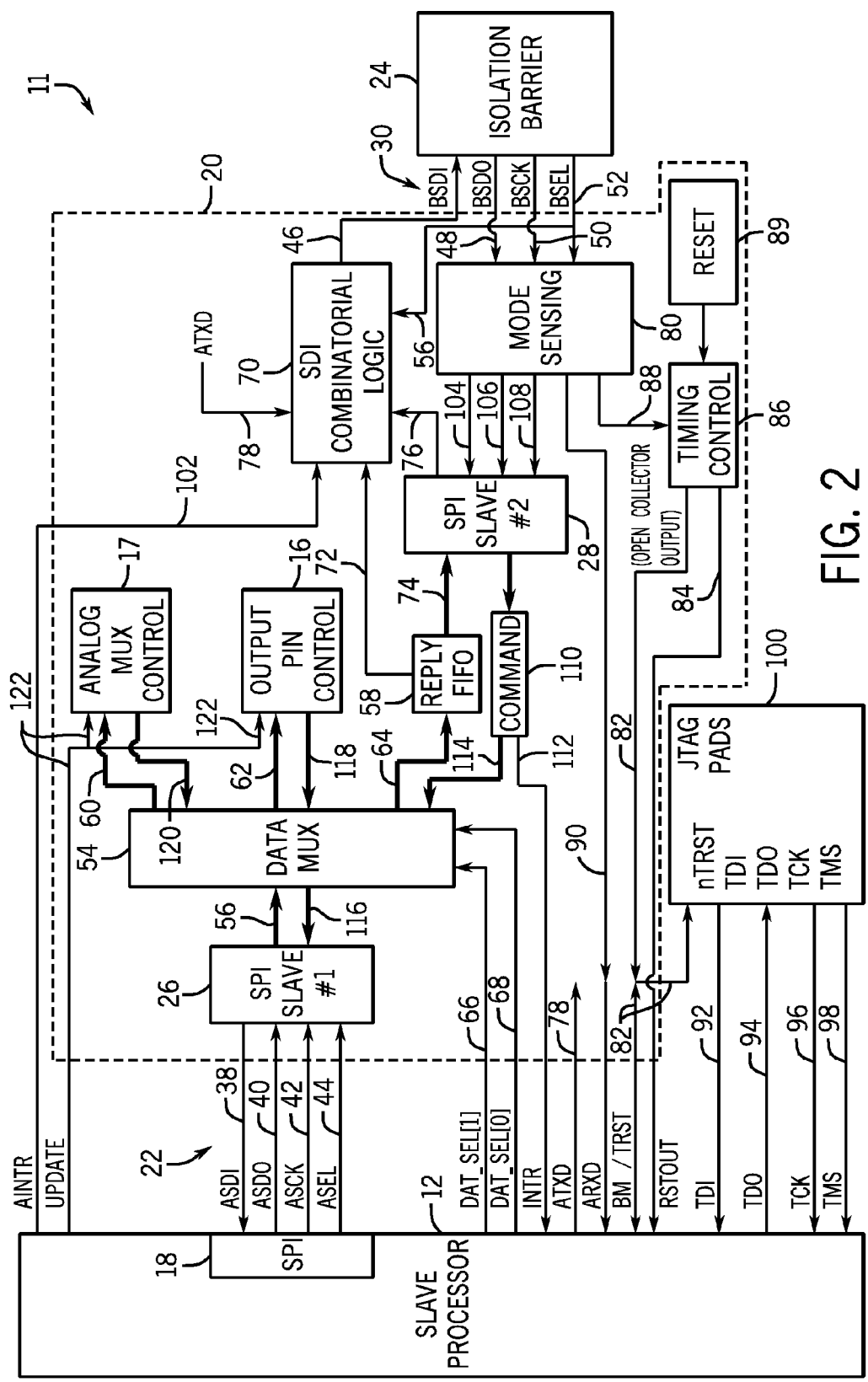
FIG. 2 is a detailed block diagram of an embodiment of the master processor communicatively coupled to the slave processor of FIG. 1.

FIG. 2 illustrates a detailed block diagram of an embodiment of the data acquisition system 11. In the depicted embodiment, the slave processor 12 is communicatively connected to the master processor 14 shown in FIG. 1 through the use of the SPI bridge 20 and the isolation barrier 24. As mentioned above, the SPI bridge 20 may enable the use of the SPI port 18 for communicating with the master processor 14, the output control 16, and the analog multiplexor control 17. By using the SPI bridge 20, the SPI port's 18 "four-wire" design may be leveraged into providing for extended functionality (e.g., communicating with the master processor 14, the output control 16, and the analog multiplexor control 17) while using four SPI signals, such as a SPI data input (ASDI) 38, a SPI data output (ASDO) 40, a SPI clock (ASCK) 42, and a SPI select (ASEL) 44. Further, the master processor 24 need not be modified because of the master processor's support for corresponding SPI signals master data input (BSDI) 46, master data output (BSDO) 48, master clock (BSCK) 50, and master select (BSEL) 52. That is, the master processor 14 may communicate through its own SPI port with the slave processor 12 by using the standard SPI protocols without any additional modifications.

In the depicted embodiment, the SPI bridge 20 enables the communicative mapping of the slave processor's ASDI 38, the ASDO 40, the ASCK 42, and the ASEL 44 to the master processor's BSDI 46, BSDO 48, BSCK 50, and BSEL 52, respectively. In one example, when the slave processor 12 performs a transfer of data, information flows into the SPI registers 26. The information then continues to flow into a data multiplexor through path 56. Depending on addressing data (e.g., bits use to route the information), the information may then flow into the output pin control 16, the analog multiplexor control 17, or reply registers (e.g., first in first out [FIFO]) through lines 60, 62, or 64. Data select lines 66 and 68 may be used to provide the data multiplexor 54 with addressing information to route signals to the output pin control 16, the analog multiplexor control 17, or the reply registers 58. It is to be noted that, in other embodiments, additional data select lines may be used to enable the transfer of information between the slave processor 12, a plurality of output pin controls 16, a plurality of analog multiplexor controls 17, and a plurality of reply registers 58.

The reply registers 58 may include 32 bits suitable for building, for example, a 32-bit reply before transmitting the reply to the master processor 14. For example, four transfers of 8 bit data may be buffered by the reply registers 58, resulting in a 32-bit reply. When a reply, such as the 32-bit reply is ready, a serial data interface (SDI) combinatorial logic system 70 may be used to submit the reply from the reply registers 58 to the master processor 14 through the isolation barrier 24. In one embodiment, the SDI combinatorial logic system 70 may pulse the BSDI 46, thus giving notice to the master processor 14 of the reply incoming from the slave processor 12. The reply may be transmitted from the reply registers 58 to the SDI combinatorial logic system 70 through line 72. Likewise, the reply may be transmitted from the reply registers 58 to the SPI registers 28 through line 74, and then to the SDI combinatorial logic system through line 76. Similarly, data may be transmitted from the slave processor 12 to the SDI combinatorial logic system 70 through a transmit (ATXD) line 78, and then pulsed to the master processor through the BSDI 46.

A mode sensing system 80 may also be used to minimize the number of pins used by the isolation barrier 24. In the depicted embodiment, the mode sensing system 80 may be continuously monitoring the BSEL 52 for an inactive signal. When the BSEL 52 is inactive, the SPI protocol is designed to ignore the master clock BSCK 50, ignore the master output data BSDO 48, and leave the master input BSDI 46 in a fixed state. Instead of ignoring the BSCK 50 and the BSDO 48, the mode sensing system 80 enables the transfer of data when the BSEL 52 is inactive. Various data transfer modes may be used when the BSEL 52 is inactive. For example, in a JTAG mode, reprogramming data may be communicated to the slave processor 12 through the isolation barrier 24 by using a boot mode transmit (BM/TRST) line 82 and/or a reset out (RSTOUT) line 84. Accordingly, the mode sensing system 80 may interface with a timing control system 86 through line 88 to drive the JTAG lines 82 and 84. Additionally, a reset system 89 is provided, suitable for resetting the timing control system 86 and/or the SPI bridge 20. In a data transfer mode, data, such as master command data, may be sent to the slave processor 12 through a receive (ARXD) line 90.

In certain embodiments, a custom set of data patterns may be used to denote the transfer modes. For example, patterns with 4 or more 1s or 0s in a row may be ignored by the mode sensing system 80 to allow for slower universal asynchronous receiver/transmitter (UART) data transmissions. In this embodiment, by setting the baud rate on the UART to a slower baud rate than the baud rate used for transmitting the custom patterns, the UART will not respond to the custom patterns being used to set the transfer modes. Some example custom data patterns that may be used for JTAG transfer modes are as follows: Pattern "01100110" may be used to set the JTAG reset line 84. Pattern "01110111" may be used to clear the JTAG reset line 84. Pattern "10011001" may be used to set the JTAG boot mode line 82. Pattern "10001000" may be used to clear the JTAG boot mode line 82. For example, asserting the boot mode line 82 while allowing the reset line 84 to go inactive (e.g., first asserting the reset line 84 and then setting the reset line 84 inactive) may result in the slave processor 12 waiting for JTAG program information communicated through the SPI port 26 or the ARXD 78. Certain JTAG program information may result in the slave processor 12 entering a download mode, while other JTAG program information may result in the slave processor 12 jumping to a certain location in memory and executing a program, such as a factory program, found in memory. Additionally, lines pad input (TDI) 92, pad output (TDO) 94, pad clock (TCK) 96, and pad select (TMS) 98 may be used by a JTAG pad 100 for download of JTAG debugging or programming information.

Other example custom data patterns that may be used for data transfers between the slave processor 12 and the master processor 14 are as follows: Pattern "11000111" may be used to select the ATXD 78 driving or writing to the BSDI 46 through the SDI combinatorial logic system 70 when the BSEL 52 is inactive. This same pattern may also be used in preparing the ARXD 90 to received data through the BSDO 48, for example, for programming support. Pattern "11001110" may be used to select the reply registers 58 to drive the BSDI 46 with data when BSEL 52 is inactive. Likewise, pattern "11011100" may be used to select an interrupt line (AINTR) 102 to drive the BSDI 46 when the BSEL 52 is inactive. It is to be noted that any number of custom data patterns may be used, in additional to or alternative to the aforementioned example data patterns. By providing for custom patterns, the SDI combinatorial logic 70 and the mode sensing system 80 may efficiently enable the communicative interface between the slave processor 12 and the master processor 14 while minimizing signal lines flowing through SPI buses 22 and 30.

During data transfers incoming from the master processor 14 and using the standard SPI protocol, the data may flow through the isolation barrier 24 into the mode sensing system 80. The mode sensing system 80 may then direct the data into the SPI registers 28 through lines 104, 106, and/or 108. For example, 8-bit commands may be sent from the master processor 14 into the SPI registers 28. No modification on the master processor 14 would be used for these standard SPI data transfers. The reply registers 58 may then be emptied out in preparation for fulfilling a response to the master processor's request. Likewise, a command register 110 may be loaded with the SPI data incoming from the master processor 14. The command register 110 may then assert an interrupt through interrupt line 112. The interrupt notifies the slave processor 12 of incoming SPI data. Accordingly, the slave processor 12 may drive the data select lines 66 and 68 to provide for a data path from the command register 110 into the SPI registers 26 through a line 114, the data multiplexor 54 and a line 116. The SPI port 18 may then receive the information from the SPI registers 26 through the bus 22.

As mentioned above, a reply to the master processor's command may be prepared by using the reply register 58, and may be subsequently transmitted into the master processor 14 through the isolation barrier 24. Likewise, the data select lines 66 and 68 may be used to receive data through the data multiplexor 54 incoming from the output pin control 16 through line 118 or from the analog multiplexor control 17 through line 120. By providing for standard SPI data transfers in addition to custom data transfers, the SPI bridge 20 may enable a more comprehensive and efficient communication with the master processor 14, the output pin control 16, and the analog multiplexor control 17.

In one embodiment, an update line 122 may be used to load pin states (e.g., output pin control 16, analog multiplexor control 17), other ports for input pins, other serial ports for inter-integrated circuits (I2C), other SPI ports to external circuitry, and/or for byte/word port selection where the ports are wider than 8 bits. Other data paths within the SPI bridge 20 may thus include a selection of the slave SPI information for flow to the output pin control 16 and the analog multiplexor control 17. Accordingly, to allow for preset of these functions, the update line 122 may be used to load all of the aforementioned signal pins and I2C serial port at the same time. In this manner, the slave processor 12 could be performing setup operations over a period of time prior to pulsing the update line 122. This functionality allows for improved controlled timing state changes in the hardware of the SPI bridge 20 and eases execution code timing.

Figure 3:
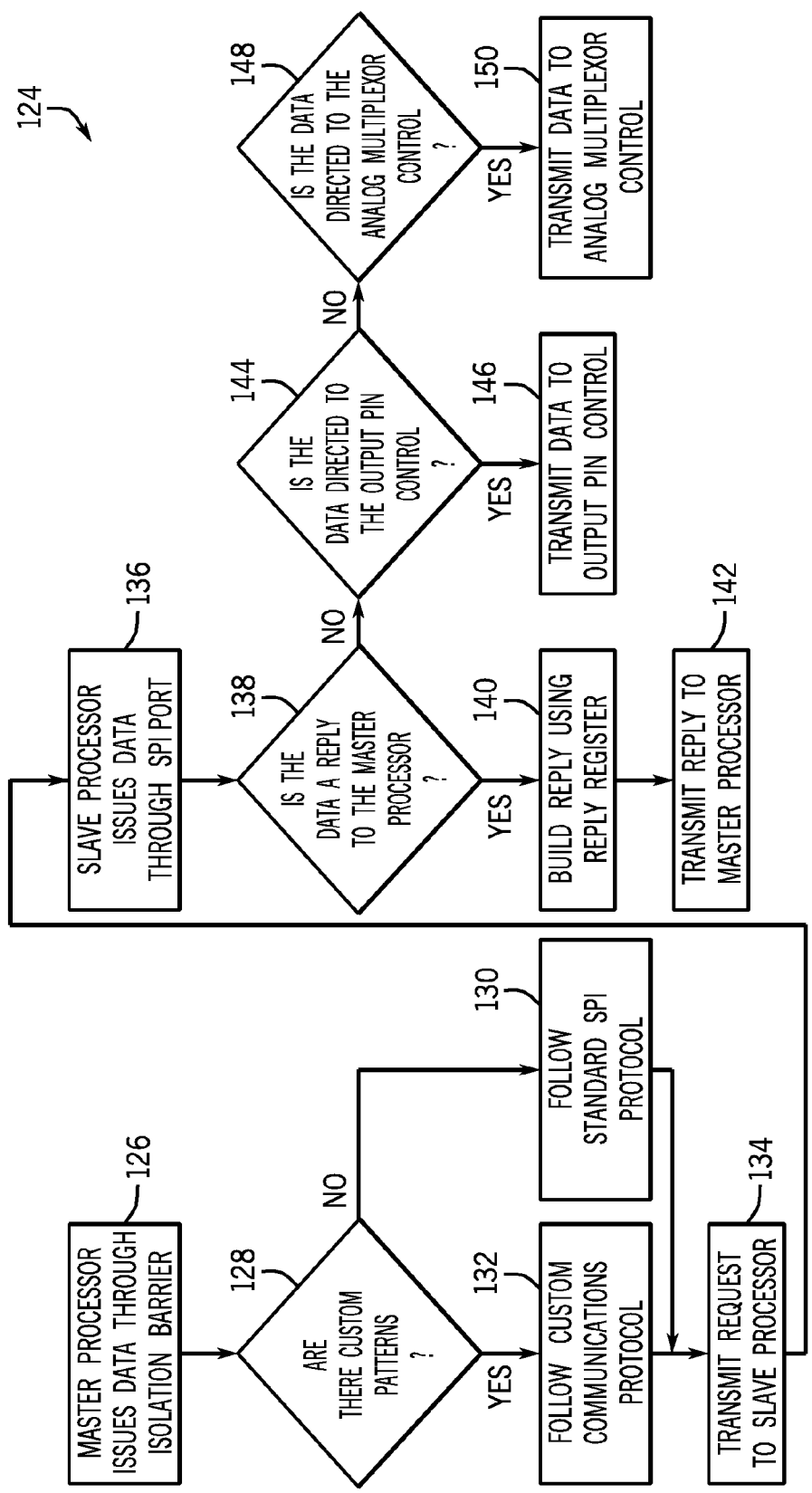
FIG. 3 is a flow chart of an embodiment of a process for interfacing the master processor with the slave processor of FIGS. 1 and 2.

FIG. 3 depicts an embodiment of a process 124 suitable for transmission of information from the slave processor 12 and/or the master processor 14 shown in FIG. 1. In the depicted embodiment, the master processor 14 may issue data (block 126) through the isolation barrier 24. The process 124 may determine if the data issued includes custom data patterns (decision 128). As mentioned above with respect to FIG. 2, the mode sensing system 80 may be continuously monitoring the SPI port 30 for the appearance of certain custom data patterns. For example, the BSEL 56 may be set inactive and the master processor 14 may issue custom data patterns with 4 or more 1s or 0s in a row. If no custom data patterns are detected (decision 128), then the process 124 may treat the master processor communication as communications following the standard SPI protocol (block 130). As mentioned above, in one embodiment, the master processor 14 may use the SPI bridge 20 to provide the standard SPI data to the slave processor 12 through the use of the command register 110. If custom patterns are detected (decision 128), then the process 124 may follow a custom communications protocol (block 132). Regardless of the type of communication, the master processor's request may be transmitted (block 134) to the slave processor 12. For example, the master processor 14 may provide custom communications directed to the slave processor 12 through the ARXD 90 line, and/or the ASDI line 38, with the slave processor responding through the ATXD 78 line, and/or through the SPI registers 26. The master processor 14 may also issue JTAG-related custom communications based on the custom data patterns, as described above with respect to FIG. 2.

The process 124 may also enable the slave processor 12 to issue data (block 136) through the SPI port 26. For example, the data may be directed as a reply to the master processor 14, or a communications directed to the output pin control 16 or to the analog multiplexor control 17 shown in FIGS. 1 and 2. If the data is a reply (decision 138) to the master processor 14, then the process 124 may build the reply (block 140) by using the reply register 58. As described above with respect to FIG. 2, the reply register 58 may be used to build a reply, including a reply larger than 8 bits (e.g., 16 bits, 32, bits, 64 bits, 128 bits) through one or more data transfers through the data multiplexor 54 by using the data select lines 66 and 68. The reply may then be transmitted (block 142) to the master processor 14. For example, the SDI combinatorial logic system 70 may be used to transmit data from the reply register 58 into the master processor 14 through the BSDI 46.

If the process 124 determines that the data is not a reply (decision 138) to the master processor 14, then the process 124 may determine if the data is directed (decision 144) to the output pin control 16. If the data is directed to the output pin control 16, then the slave processor 12 may transmit the data (block 146) to the output pin control 16. For example, the data select lines 66 and 68 may be used to route the data through the data multiplexor 54 into (and out of) the output pin control 16. If the process 124 determines that the data is not directed (decision 144) to the output pin control 16, then the process 124 may determine if the data is directed (decision 148) to the analog multiplexor control 17. If the data is directed (decision 148) to the analog multiplexor control 17, then the slave processor 12 may communicate with the analog multiplexor control 17 to send the data. For example, the data select lines 66 and 68 may be used to route the data through the data multiplexor 54 into (and out of) the analog multiplexor control 17. By providing for communications between the slave processor 12 and the master processor 14, the output pin control 16, and the analog multiplexor control 17 while minimizing pin count and reusing the slave processor's SPI port 18, the systems and methods described herein may enable extended communications functionality while maximizing signal quality and minimizing circuit noise.

Technical effects of the invention include enabling the communications between a slave processor's SPI port and a master processor, an output pin control, and an analog multiplexor control. In one embodiment, a single "four wire" SPI port is used to communicate with all three of the master processor, the output pin control, and the analog multiplexor control by using a SPI bridge. The SPI bridge additionally enables the use of JTAG instructions through the isolation barrier. Custom communications as well as standard SPI communications are enabled through the SPI bridge. Custom data patterns may be observed when the SPI select line is inactive, leading to the execution of logic related to the custom patterns. Further technical effects include the minimization of pins in an isolation barrier, thus resulting in improved signal quality and minimized circuit noise.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a first processor comprising a serial peripheral interface (SPI) port;
a second processor;
a galvanic isolation barrier;
wherein the galvanic isolation barrier comprises four pins configured to communicatively couple the galvanic isolation barrier to the SPI bridge;
wherein the four pins comprise a master processor input (BSDI) pin, a master processor output (BSDO) pin, a master processor clock (BSCHK) pin, and a master processor select (BSEL) pin;
a SPI bridge comprising:
a first output pin control configured to control a device; and
a first analog multiplexor control configured to route signals to a circuitry, wherein the SPI bridge is configured to communicatively couple the first processor with the second processor through the galvanic isolation barrier, and to communicatively couple the first processor to the device through the first output pin control, and to route the signals between the first processor and the circuitry by using the first analog multiplexor control.

2. The system of claim 1, wherein the SPI bridge comprises a mode sensing system configured to monitor the BSEL pin and to detect the transmission of a custom data pattern.

3. The system of claim 2, wherein the custom data pattern comprises at least 4 1s, 4 0s, or a combination thereof.

4. The system of claim 1, wherein the SPI bridge comprises a serial digital interface (SDI) combinatorial logic system configured to pulse the BSDI pin to transmit data incoming from the first processor through the isolation barrier and into the second processor.

5. A system comprising:
a first processor comprising a serial peripheral interface (SPI) port;
a second processor;
a galvanic isolation barrier;
a SPI bridge comprising:
a first output pin control configured to control a device;
a first analog multiplexor control configured to route signals to a circuitry, wherein the SPI bridge is configured to communicatively couple the first processor with the second processor through the galvanic isolation barrier, and to communicatively couple the first processor to the device through the first output pin control, and to route the signals between the first processor and the circuitry by using the first analog multiplexor control; and
a reply register configured to store a reply data based on a command from the second processor.

6. The system of claim 5, wherein the reply data comprises a plurality of data transfers from the first processor.

7. A system comprising:
a first processor comprising a serial peripheral interface (SPI) port;
a second processor;
a galvanic isolation barrier;
a SPI bridge comprising:
a first output pin control configured to control a device;
a first analog multiplexor control configured to route signals to a circuitry, wherein the SPI bridge is configured to communicatively couple the first processor with the second processor through the galvanic isolation barrier, and to communicatively couple the first processor to the device through the first output pin control, and to route the signals between the first processor and the circuitry by using the first analog multiplexor control; and
a command register configured to interrupt a first register based on data incoming from the second processor.

8. A method comprising:
transmitting data from a first processor through an isolation barrier;
determining if the data includes a custom pattern;
if the data does not includes the custom pattern, using a serial peripheral interface (SPI) communications protocol;
if the data includes the custom pattern, using a custom communications protocol;
transmitting the data to a second processor;
building a reply by using a reply register;
communicating the reply to the first processor through the isolation barrier;
wherein the custom pattern comprises at least 4 1s, 4 0s, or a combination thereof.

9. A system comprising:
a serial peripheral interface (SPI) bridge configured to communicatively couple a first processor having a SPI port to a second processor comprising:
a data multiplexor configured to route signals for the first processor;
a first register configured to communicatively couple the data multiplexor to the first processor;
an output pin control communicatively coupled to the data multiplexor and configured to control a device;

a serial digital interface (SDI) combinatorial logic system;
a second register communicatively coupled to a second processor through the SDI combinatorial logic system;
a reply register communicatively coupled to the data multiplexor, wherein the first processor is configured to use the data multiplexor to reply to a command issued by the second processor through an isolation barrier;
a mode sensing system configured to monitor the second processor for a custom data pattern and to enable the first processor to communicate by using a SPI protocol or a custom protocol based on the custom data pattern;
wherein the mode sensing system is communicatively coupled to a processor select (BSEL) line of the isolation barrier to monitor the second processor for the custom data pattern.

* * * * *